United States Patent [19]

Swauger

[11] Patent Number: 5,503,438
[45] Date of Patent: Apr. 2, 1996

[54] FLARED TUBE COUPLING HAVING A DISPOSABLE SEALING BOOT

[76] Inventor: Jonathan L. Swauger, 28163 Tambora Dr., Canyon country, Calif. 91351

[21] Appl. No.: 387,160

[22] Filed: Feb. 10, 1995

[51] Int. Cl.⁶ .................................................. F16L 19/00
[52] U.S. Cl. ....................... 285/332.2; 285/332.4; 285/354; 277/207 A; 277/168
[58] Field of Search ....................... 285/332.2, 334.5, 285/332, 354, 332.4; 277/207 A, 110, 121, 168

[56] References Cited

U.S. PATENT DOCUMENTS

| | | |
|---|---|---|
| 1,133,320 | 3/1915 | Rockwood .................. 277/207 A |
| 2,251,715 | 8/1941 | Parker . |
| 2,501,943 | 3/1950 | Jack .......................... 277/207 A |
| 2,615,740 | 10/1952 | Nathan ...................... 277/207 A |
| 2,670,972 | 3/1954 | Huet .......................... 285/322.4 |
| 2,780,483 | 2/1957 | Kessler ...................... 285/354 |
| 3,016,722 | 1/1962 | Batdorf ...................... 277/207 A |
| 3,024,047 | 3/1962 | Schmohl . |
| 3,080,183 | 3/1963 | Luertzing et al. ............ 277/207 A |
| 3,139,294 | 6/1964 | Richards, Jr. . |
| 3,195,936 | 7/1965 | Conder . |
| 3,226,138 | 12/1965 | Ellis . |
| 3,239,247 | 3/1966 | Pickert . |
| 3,278,206 | 10/1966 | Woodling . |
| 3,353,912 | 1/1968 | Holloway ................... 277/207 A |
| 3,411,812 | 11/1968 | Prince et al. . |
| 3,979,130 | 9/1976 | Cowie ....................... 277/207 A |
| 4,693,502 | 9/1989 | Oetiker . |
| 4,801,160 | 1/1989 | Barrington .................. 285/354 |
| 4,848,804 | 7/1989 | Weigl ........................ 285/354 |

FOREIGN PATENT DOCUMENTS

| | | | |
|---|---|---|---|
| 375439 | 3/1973 | U.S.S.R. . | |
| 1449757 | 1/1989 | U.S.S.R. .................. | 285/332.2 |

OTHER PUBLICATIONS

Advertising brochure entitled Calgraph Flexible Graphite by Polycarbon, Inc.; 8 pages; date: Aug., 1992.

*Primary Examiner*—Randolph A. Reese
*Assistant Examiner*—Heather Chun Shackelford
*Attorney, Agent, or Firm*—Kelly, Bauersfeld & Lowry

[57] ABSTRACT

In a tube coupling a resilient sealing boot is disposed between facing frusto-conical sealing surfaces to prevent fluid flow therebetween. A first tube is provided an external frusto-conical sealing surface and an outer cylindrical surface adjoining the external sealing surface, and a second tube is provided an internal frusto-conical sealing surface within an end thereof. The sealing boot is preferably formed entirely of a flexible graphite material to include a cylindrical collar that fits over the outer cylindrical surface of the first tube, and a skirt having one or more integral O-rings which engage one or both of the facing frusto-conical sealing surfaces as the ends of the first and second tubes are drawn together.

9 Claims, 1 Drawing Sheet

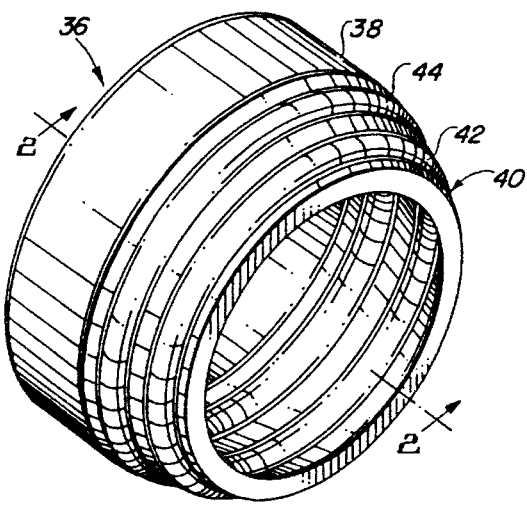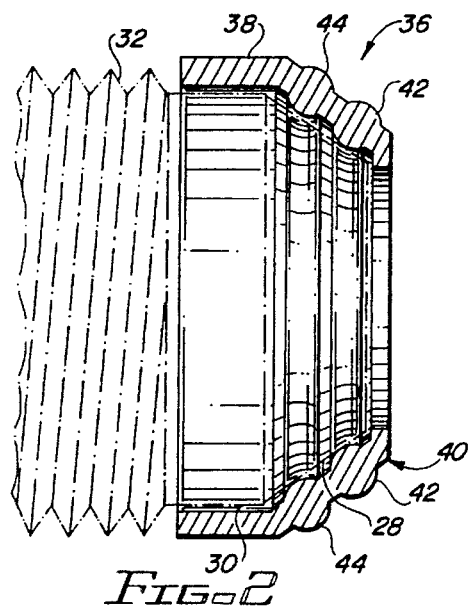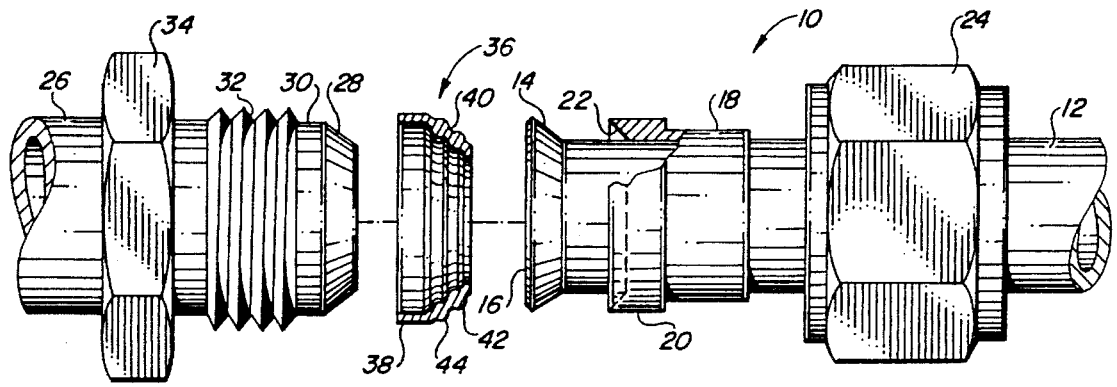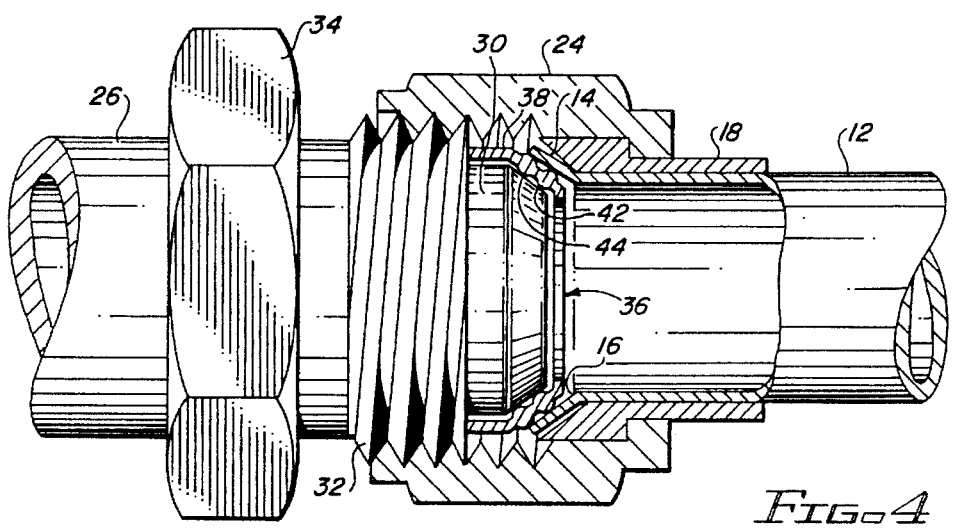

5,503,438

FLARED TUBE COUPLING HAVING A DISPOSABLE SEALING BOOT

BACKGROUND OF THE INVENTION

This invention relates generally to flared tube fittings and tube couplers. More specifically, the present invention relates to a resilient sealing boot having a frusto-conical skirt disposed between facing frusto-conical sealing surfaces, wherein the skirt includes at least one O-ring sealing means which sealingly engages at least one of the frusto-conical sealing surfaces to prevent fluid flow.

In the past, considerable difficulty has been encountered in forming a fluid-tight joint between the flared end of a tube and a coupling member with which the tube flare is engaged when the coupling member and the tube are made of hard and tough materials such as certain grades of stainless steel. With such hard and tough materials, irregularities on the mating surfaces of the tube flare and the coupling member cannot be "ironed" out as occurs with tubes and coupling members made of metals such as copper, brass, aluminum, aluminum alloy, etc. The aforesaid leakage problem may be alleviated to some extent by accurately forming and polishing the mating surfaces, but this expedient is much too expensive to be any commercial value. Moreover, because drawn tubing is employed most frequently, it is likely that the inside surface will have lengthwise extending scratches or imperfections. Of course, hairline scratches or other imperfections on the inside of the tube flare may also result from the flaring operation.

Attempts to solve the above-noted leakage problem include the employment of a washer of ductile material introduced between the mating surfaces of the tube and the fitting, use of gasket-like crushable sealing washers, or, as mentioned above, the machining of extremely smooth finishes on mating parts. See, for example, U.S. Pat. Nos. 3,139,294 and 3,411,812. Although under some circumstances these prior solutions have satisfactorily solved the leakage problems, there are conditions under which prior sealing washers have not performed well. For example, in attempting to extend the use of flared tube fittings to encompass low molecular weight gases, such as hydrogen and helium, at cryogenic or elevated temperatures and high or low pressures, the leakage problem has become acute.

Accordingly, there has been a need for an improved tube coupler that utilizes, insofar as possible, standard coupling components, and yet eliminates fluid leakage therebetween. Preferably, such an improved tube coupler would simply interpose a novel sealing boot between the flared end of a tube and the coupling member in order to eliminate any leakage between facing sealing surfaces. Such a sealing boot should provide a reliable, non-fragile point contact seal which overcomes the drawbacks of prior gaskets, and should be constructed of a material resistant to chemical or temperature degradation. The sealing boot must be of simple construction, economical, and adaptable to various uses and requirements. The present invention fulfills these needs and provides other related advantages.

SUMMARY OF THE INVENTION

The present invention resides in an improved flared tube coupling which efficiently eliminates leaks between facing sealing surfaces under virtually all operating conditions. The tube coupling comprises, generally, a first tube having an external sealing surface at an end thereof, a second tube having an internal sealing surface within an end thereof, an a sealing boot including a skirt constructed to sealingly engage at least one of the sealing surfaces. Means are provided for drawing the ends of the first and second tubes together to clamp the sealing boot between the sealing surfaces.

In a preferred form of the invention, the first tube is provided an external frusto-conical sealing surface at an end thereof and an outer cylindrical surface adjoining the external sealing surface. The second tube has an internal frusto-conical sealing surface within an end thereof. The sealing boot includes a cylindrical collar that fits over the outer cylindrical surface of the first tube, and a skirt having O-ring sealing means dimensioned to sealingly engage at least one the sealing surfaces. Preferably, the skirt is integrally formed with the cylindrical collar of a flexible graphite material, and a pair of O-ring sealing means are provided to sealingly engage both sealing surfaces to prevent fluid flow therebetween. Alternatively, the sealing boot may be formed entirely of a thermosetting elastomeric compound or of a teflon material.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a sealing boot embodying the present invention;

FIG. 2 is an enlarged sectional view taken generally along the line 2—2 of FIG. 1;

FIG. 3 is an exploded, fragmented elevational view of a flared tube coupling employing the sealing boot of FIGS. 1 and 2; and FIG. 4 is a fragmented, partially sectional elevational view similar to FIG. 1, illustrating the tube coupling in an assembled configuration.

DETAILED DESCRIPTION OF THE PREFERRED EMBODIMENT

The present invention is concerned with an improved flared tube coupling, generally designated in the accompanying drawings by the reference number 10. The tube coupling 10 conventionally includes a tube 12 which has a flared end 14 that defines an internal frusto-conical sealing surface 16. A race 18 is slideably supported on the tube 12 and includes a shoulder portion 20 that includes an inner beveled surface 22 which is adapted to bear against the external surface of the flared end 14 during a coupling procedure. A nut 24 is also slideably disposed over the tube 12 and is configured to engage a portion of the race 18 during the coupling procedure.

Another segment of tubing 26 or a coupling member includes an external frusto-conical sealing surface 28 at an end thereof and an outer cylindrical surface 30 which adjoins the sealing surface 28. Also adjoining the cylindrical surface 30 opposite the sealing surface 28 are threads 32 which are engaged by the nut 24 during the coupling operation (see FIG. 4). A rigid collar 34 is fixed to the tubing 26 to provide a hex-gripping surface useful when turning the nut 24 over the threads 32.

In accordance with the present invention, a resilient sealing boot 36 is disposed between the tube 12 and the tubing 26 so as to prevent leakage between the sealing surfaces 16 and 28 when the coupling 10 components are secured together. The sealing boot 36 includes a cylindrical collar 38 that fits over the outer cylindrical surface 30 of the tubing section 26, and a frusto-conical skirt 40 which conforms generally to the shape of both sealing surfaces 16 and 28. The skirt 40 is preferably integrally formed with the cylindrical collar 38 of a material which minimizes or eliminates temperature and chemical degradation of the seal provided. In less severe environments it has been found that thermosetting elastomeric compounds are satisfactory since this material is not susceptible to cold flow and is far more resistant to chemical degradation than typical vinyl materials used in prior valve seals. In more severe environments, the sealing boot may be made entirely of a teflon material. For even more severe environments, the sealing boot may be made entirely of flexible graphite.

The skirt 40 advantageously includes O-ring sealing means which are dimensioned to sealingly engage at least one of the sealing surfaces 16 and 28. As shown in the accompanying drawings, two integrally formed O-rings 42 and 44 are provided which engage both sealing surfaces 16 and 28 simultaneously when the tube 12 is coupled securely to the tubing 26. The cylindrical integrity of O-rings 42 and 44 is inherently stronger and far superior to prior seal designs in resisting distortion of the sealing surfaces of the sealing boot 36, and in accommodating distortions in the sealing surfaces 16 and 28. The provision of O-ring sealing means in the improved sealing boot 36 represents much more than a mere cosmetic change to known sealing boots. The present invention represents an advance which virtually eliminates all of the shortcomings in the prior seals which have permitted unacceptable levels of leakage.

Although a particular embodiment of the invention has been described in detail for purposes of illustration, various modifications may be made without departing from the spirit and scope of the invention. Accordingly, the invention is not to be limited, except as by the appended claims.

I claim:

1. A tube coupling, comprising:

a first tube having an external frusto-conical sealing surface at an end thereof and an outer cylindrical surface adjoining the external frusto-conical sealing surface;

a second tube having an internal frusto-conical sealing surface within an end thereof;

a resilient sealing boot having a frusto-conical skirt including at least one O-ring sealing means dimensioned to sealingly engage at least one of the frusto-conical sealing surfaces, and a cylindrical collar that fits over the outer cylindrical surface; and means for drawing the ends of the first and second tubes together to clamp the sealing boot between the frusto-conical sealing surfaces, whereby the O-ring sealing means prevents fluid flow between the frusto-conical sealing surfaces.

2. The tube coupling of claim 1, wherein the skirt of the sealing boot is integrally formed with the cylindrical collar.

3. The tube coupling of claim 1, wherein the O-ring sealing means sealingly engages both of the frusto-conical sealing surfaces to prevent fluid flow therebetween.

4. The tube coupling of claim 3, wherein the sealing boot includes a pair of O-ring sealing means.

5. The tube coupling of claim 1, wherein the sealing boot is formed entirely of a thermosetting elastomeric compound.

6. The tube coupling of claim 1, wherein the sealing boot is formed entirely of a teflon material.

7. The tube coupling of claim 1, wherein the sealing boot is formed entirely of a flexible graphite material.

8. A tube coupling, comprising:

a first tube having an external frusto-conical sealing surface at an end thereof and an outer cylindrical surface adjoining the external sealing surface;

a second tube having an internal frusto-conical sealing surface within an end thereof;

a resilient sealing boot including a cylindrical collar that fits over the outer cylindrical surface of the first tube, and a skirt integrally formed with the cylindrical collar and having sealing means dimensioned to sealingly engage at least one of the sealing surfaces, the boot being formed entirely of a flexible graphite material, wherein the sealing means sealingly engages both of the frusto-conical sealing surfaces to prevent fluid flow therebetween, and includes at least one O-ring integrally formed with the skirt; and means for drawing the ends of the first and second tubes together to clamp the sealing boot between the sealing surfaces, whereby the sealing means prevents fluid flow between the sealing surfaces.

9. The tube coupling of claim 8, wherein the at least one O-ring comprises a pair of O-rings integrally formed with the skirt.

\* \* \* \* \*